Dec. 29, 1970  W. E. LOTZ  3,550,189
PATTY FORMING MACHINE

Filed Nov. 18, 1968  4 Sheets-Sheet 1

INVENTOR
WALTER E. LOTZ
BY
Leon Arthurs
Agent

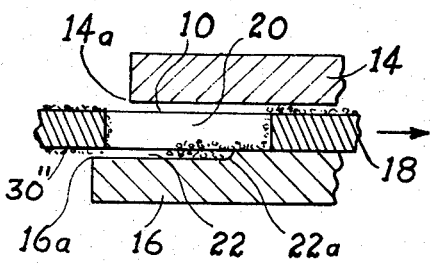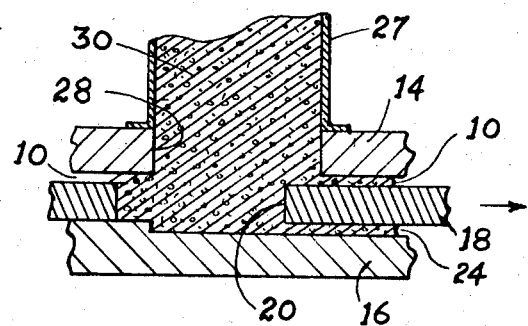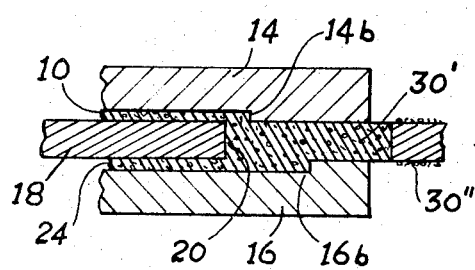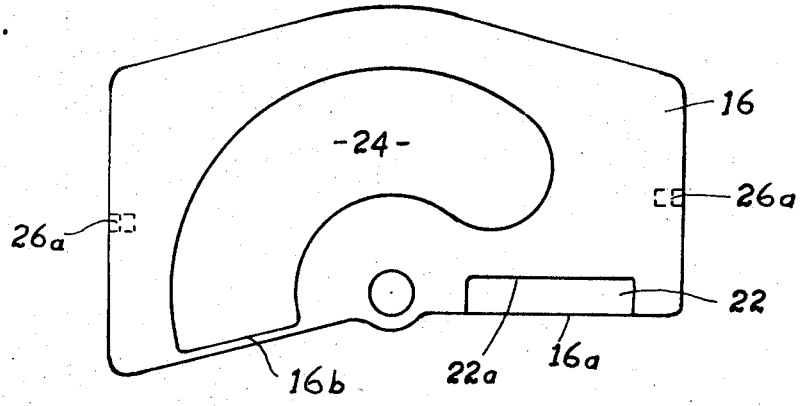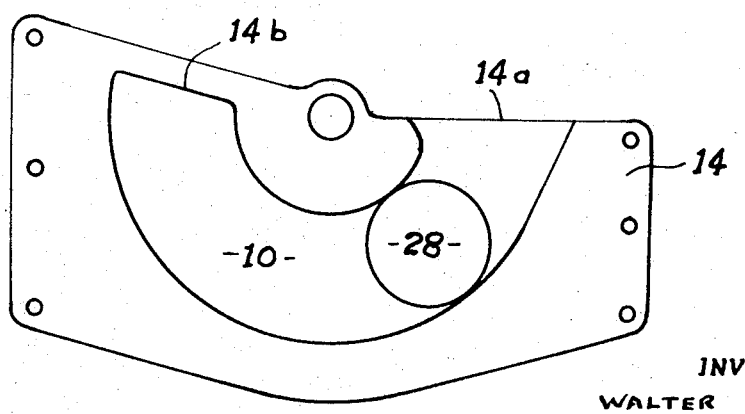

Dec. 29, 1970  W. E. LOTZ  3,550,189
PATTY FORMING MACHINE
Filed Nov. 18, 1968  4 Sheets-Sheet 3

INVENTOR
WALTER E. LOTZ
BY
Leon Arthurs
Agent

Dec. 29, 1970  W. E. LOTZ  3,550,189
PATTY FORMING MACHINE
Filed Nov. 18, 1968  4 Sheets-Sheet 4
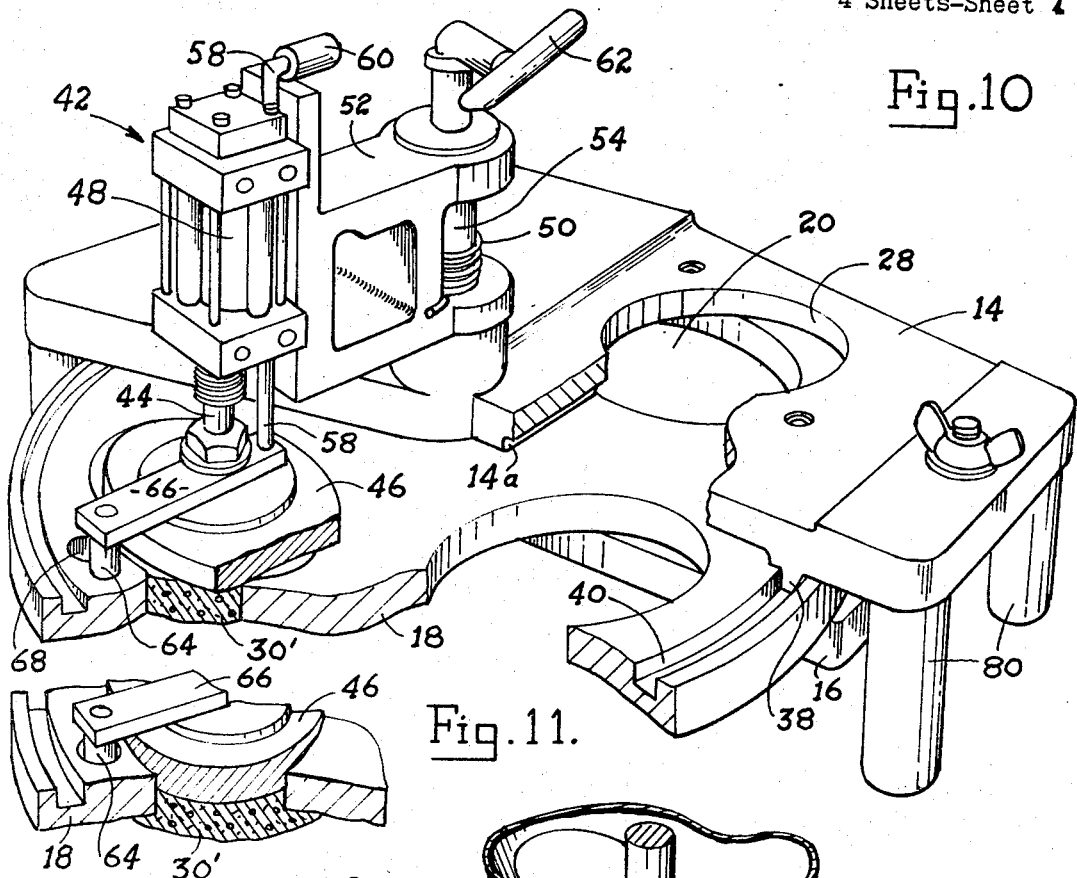
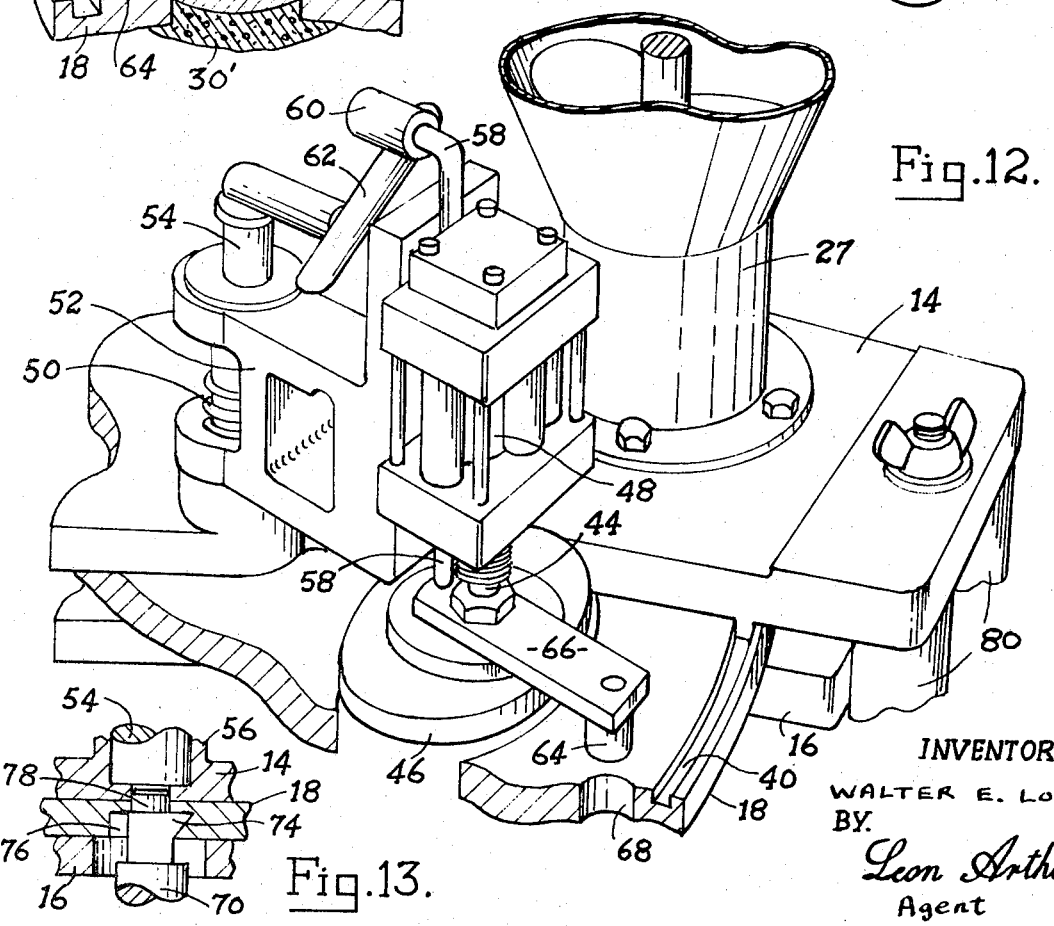
INVENTOR
WALTER E. LOTZ
BY
Leon Arthurs
Agent

# United States Patent Office

3,550,189
Patented Dec. 29, 1970

3,550,189
PATTY FORMING MACHINE
Walter E. Lotz, 74 Laureleaf Road,
Thornhill, Ontario, Canada
Filed Nov. 18, 1968, Ser. No. 776,380
Int. Cl. A22c 7/00
U.S. Cl. 17—32       12 Claims

ABSTRACT OF THE DISCLOSURE

A hamburger forming machine having a continuously rotatable molding plate sandwiched between stationary clamping plates wherein spaced molds in the molding plate can pass through a pressurized meat-charging chamber provided between the clamping plates for filling the molds therein. After filling, the molds are successively discharged of their formed hamburgers by a pneumatically operated plunger exterior of the clamping plates; the empty molds then being recycled for recharging as above.

---

The invention relates to method and means for the mass production of patties of raw hamburger or like material having a pasty or glutinous consistency. The patties of particular interest to this invention are those which are normally provided in the raw, formed state to restaurants where they are ultimately cooked and served.

As will be appreciated, various problems present themselves in connection with the production of patties for the restaurant trade. For example, significant factors are the dimensions of the patties, the weight of material contained therein, the consistency thereof and so forth. In addition, uniformity is a most important desideratum in patties of interest to the invention.

As to the mechanism used in the production thereof, it is understandably important that such mechanism be efficient to avoid wastage of the patty material and it is likewise important that the mechanism be capable of easy assembly and disassembly for cleaning, adjustment and so forth. It also goes without saying that the said machinery should be economical to manufacture, be efficient and reliable in use, and be capable of producing patties at a relatively rapid rate.

An important object of the invention is, therefore, to provide a method of producing patties as aforesaid capable of expeditiously yielding products of uniform weight, dimension and consistency and an equally important object of this invention is to provide machinery for carrying out the method of the invention efficiently, reliably and economically.

In more specific detail, the invention seeks to provide patty forming machinery capable of rapid assembly and disassembly particularly for removing, cleaning or replacing those of its parts which come into actual physical contact with the patty material or which goven the size and other physical properties of the patties produced by the machinery.

Other and more specific objects of the invention are to provide machinery as aforesaid in which facilities are provided:

For carefully regulating and procuring uniformity in the size and consistency of the patties produced thereby;

For rapid harvesting of the patties produced and, still more specifically in this same connection, facilities which will permit harvesting as aforesaid while the machine is in constant uninterrupted operation;

For actuating the specific harvesting mechanism of the machinery by motor means which respond quickly to their controls, and For reducing wastage or loss of the patty material.

The objects of the invention are achieved, in part, by a mode of forming patties which broadly includes the steps of creating and maintaining a pressurized supply of patty material, of successively introducing molds to said supply for charging with the patty material, of levelling the patty material in the molds, of transporting the charged molds to a harvesting location remote from said pressurized supply, of harvesting the patties contained in the molds, and of thereafter returning the said molds to said pressurized supply for recharging with the patty material.

In addition, the objects of the invention insofar as they relate to structure for carrying out the aforesaid operative procedures are achieved broadly by the provision of a chamber and means for filling the chamber with patty material at a rate which will create and maintain a constant pressurized supply of the material in the chamber. In addition, the invention visualizes a transport carrying at least one mold which it transports constantly and cyclically between the interior and exterior of the chamber; the mold being open to be charged with patty material on each entry into the chamber and the invention further visualizes harvesting means disposed exteriorly of the chamber for removing patties formed in the mold as aforesaid.

Further and other objects of the invention, more or less broad than the foregoing, will be apparent from the hereinafter following description of the elements, parts and principles constituting the invention, a preferred embodiment whereof is illustrated by way of example only in the hereunto annexed drawings wherein like reference devices refer to like parts of the invention throughout the several views and wherein:

FIG. 3 is a transverse cross-sectional view along the line III—III of FIG. 2 showing a part of the transport together with upper and lower clamping plates therefor;

FIG. 4 is a transverse cross-sectional view on the line IV—IV of FIG. 2;

FIG. 5 is a transverse cross-sectional view on the line V—V of FIG. 2;

FIG. 6 is a top plan view of the lower clamping plate;

FIG. 7 is an underneath plan view of the upper clamping plate;

FIG. 10 is a top perspective view of the machine showing the harvesting means in a standby position immediately prior to ejecting a patty from a mold in the transport;

FIG. 11 is a scrap perspective view showing the position of the harvesting means when ejecting a patty from the mold shown in FIG. 10;

FIG. 12 is a top perspective view similar to FIG. 10 but showing the position of the harvesting means in its emergency retraction position, and FIG. 13 is a detailed, transverse, cross-sectional view showing the engagement of the drive shaft with the transport.

Figure 9:
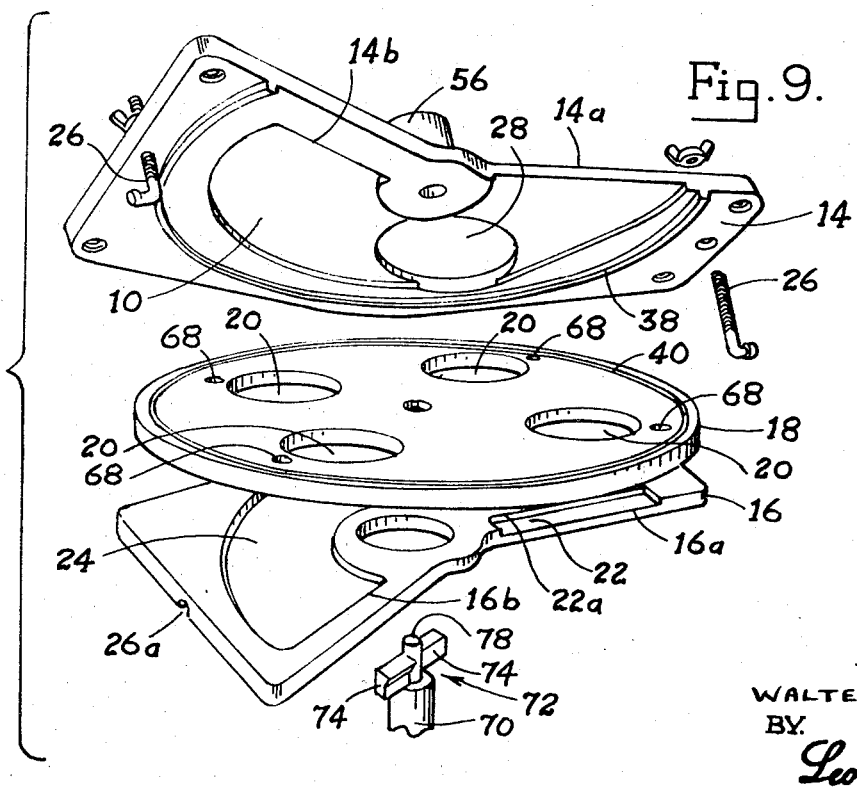
FIG. 9 is an exploded perspective view of the transport and clamping plates and also showing the drive for the transport.

A preferred embodiment of the inventive idea insofar as it relates to the machinery for forming patties includes a chamber, generally designated by the reference numeral 10, constituted in part by a trough (more fully described hereinafter and identified by the same reference numeral 10) formed in a lower face of an upper clamping plate 14 which cooperates with a lower clamping plate 16 to sandwich a portion of a transport 18 which has at least one patty mold 20 constituted, in this embodiment, by an aperture of a preferred size and shape formed therein. Referring to FIGS. 7 and 9 of the drawings, the chamber 10 of this embodiment will be seen to be of generally arcuate plan configuration extending from an inlet edge 14a of the upper plate 14 to a position adjacent an outlet edge 14b. Said chamber 10 is, in transverse section, of generally inverted channel shape having a base which may be substantially flat and, although it is somewhat flared at its inlet end, it may also be of generally uniform section throughout its length; the effective width of the chamber 10 being sufficient to procure charging of a mold 20 passing therethrough.

The lower plate 16 is relieved at two positions; a recess 22 being provided at its inlet edge 16a whilst a trough 24 extends arcuately from a position adjacent the recess 22 to an outlet edge 16b.

As will become apparent from the hereinafter following description, patty material is introduced under pressure into the chamber 10 for subsequent filling of a mold 20 as it passes cyclically through said chamber. However, it will be apparent from the drawings that, when mold 20 is positioned in communication with the upper trough 10, there will, in fact, be effective communication between trough 10, mold 20 and trough 24 in the lower plate 16. Since, as will be more fully explained herein, patty material is introduced into the top of the trough 10, it will be apparent that some of said material will pass through the mold 20 and into the trough 24 to which end the trough 24 may be regarded as forming a part of or an extension of the chamber 10.

The plates 14 and 16 are interattached by adjustable releasable fasteners 26—26 being, in this instance, the screw devices illustrated, which may be tightened or loosened to sandwich the transport 18 between the plates 14-16 under more or less pressure; the fasteners 26—26 being disposed to permit unimpeded removal and replacement of the transport 18 between the said plates 14 and 16 when they are loosened as aforesaid.

The transport 18 is, in this instance, a rotary disk as illustrated in the drawings having plane surfaces which respectively engage the mutually confronting faces of the aforesaid plates 14 and 16; the effect of tightening and loosening the fasteners 26—26 being to increase or decrease frictional pressure of the plates 14 and 16 against the transport 18. Thus, as mentioned herein, although only one mold 20 could be provided in the transport 18, it is found more expedient to utilize a plurality of such molds 20, herein exemplified by the four molds 20 which are located in the transport 18 at positions equidistantly spaced apart from one another circumferentially of transport 18.

The plates 14 and 16 cover less than the entire surface of the transport 18 which is so dimensioned and mounted for rotation about an axis so disposed that on each of its rotations, it will transport each one of its molds 20 into and through the chamber 10 to the exterior thereof.

Since the transport 18 has a fixed axis in relation to the plates 14 and 16, the mold or molds 20 which it carries will pursue a fixed locus; always entering between the plates 14-16 through an entry zone defined between edges 14a-16a and leaving the chamber 10 through an exit zone defined between edges 14b-16b.

Figure 8:
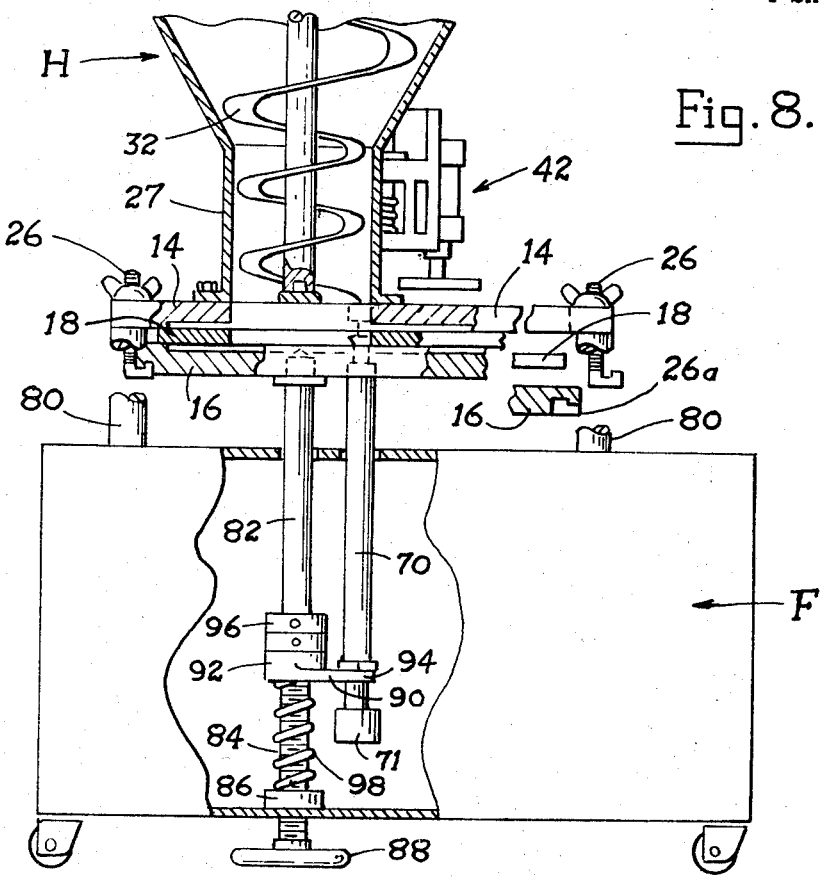
FIG. 8 is a side view of the instant machine showing the transport sandwiched between the upper and lower clamping plates with the right-hand part of the drawing showing the transport and clamping plates in their separated condition.

As is shown in FIGS. 4 and 8, a hopper H provided with a generally cylindrical spout 27 is secured to the upper plate 14 with the said spout 27 located over an orifice 28 in said plate 14 communicating between the spout 27 and the chamber 10. As will be obvious, the hopper H constitutes a reservoir from which patty material 30 is deliverable through the spout 27 and orifice 28 into the chamber 10.

It should be observed at this point that the patty material 30 is intended to be shaped into an edible product and will naturally tend to be somewhat pasty or glutinous in consistency whereby it is capable of being shaped into the small cohesive form of a patty and it is intended that all patty material as herein referred to will be deemed to have this necessary pasty, moldable, cohesive or glutinous quality.

As is clearly shown in FIG. 8 of the drawings, an auger 32 is provided in the hopper spout 27 for advancing patty material 30 from the hopper H into the chamber 10; the combination of the hopper spout 27 and auger 32 being of a type known in the art of material handling and capable of delivering the said material to the chamber 10 under some pressure which, of course, need not be particularly high but which is variable in any event by various expedients including increasing or decreasing the rotary speed of the auger 32.

In accordance with the inventive concept, the speed of the auger 32 is optimally such as to create and maintain a pressurized supply of patty material 30 in the chamber 10 with due regard being had to the amount of patty material intermittently removed from the chamber 10 in the form of patties 30' by mold or molds 20 successively entering the chamber 10 during rotation of the transport 18.

By this method of delivery, it is possible and feasible to create and maintain a pressurized supply of patty material 30 in the chamber 10 whereby, as and when the mold or molds 20 are carried into the chamber 10 by the transport 18, said mold will automatically and quickly be charged with the patty material 30 to which it is thus exposed; said material in the mold 20 resultantly assuming the mold shape and dimensions to form patty 30' in such shape and dimension.

It should be realized that, since the transport 18 is constantly moving in a direction as to carry the mold or molds 20 from the entry zone 14a-16a through the chamber 10 to the exit zone 14b-16b thereof, the patty material 30 will always be impelled by transport 18 in the same direction within the chamber 10. It will be noted, however, that chamber 10 terminates at the exit zone 14b-16b whereby, as will be seen from FIG. 5, such edges 14b and 16b serve not only to scrape superficial patty material which may be clinging to the transport 18 but also to level the patty material contained within a mold 20 to conform the thickness of the patty 30' thus formed to the thickness of the transport 18.

It should be noted at this juncture that the scraping means 14b-16b are dimensioned and oriented relative to one another and to the mold 20 to afford communication from the interior of the chamber 10 via mold 20 to the exterior of the chamber. Referring to FIG 5 of the drawings, it will be seen that the width of the plates 14-16 from said edges 14b-16b to the adjacent exterior surfaces of the chamber is smaller than the minimum diameter of a mold 20 so that the chamber 10 is never completely closed off at its said exit opening by the transport 18. Still referring to FIG. 5, it will be seen that, as the mold 20 passes out of the chamber 10 (i.e., at the position shown at 20''' in FIG. 2), communication is effectively established between the interior of the chamber 10 and the exterior of the plates 14-16 via the mold 20. Thus, by virtue of said communication between the interior and exterior of the chamber 10, a free flow of patty material 30 from the chamber 10 into the mold 20 is permitted without any blocking thereof, which blocking might occur if the mold 20 was completely sealed off by the plates 14-16 during the emergence of the mold from the chamber exit opening.

Having regard to the foregoing, it will be obvious that thicker or thinner patties are obtainable from the present machine by the simple expedient of employing transports 18 of the required thickness; said transport being interchangeable by loosening the fasteners 26—26 to permit removal of one transport 18 and its replacement by a thicker or thinner substitute followed by retightening of said fasteners 26—26. For example, the fasteners 26—26 may be released and disengaged from slots 26a—26a essentially in the manner shown in the right-hand side of FIG. 8 of the drawings permitting separation of the plates 14 and 16 and removal of the transport 18; the means by which the lower plate 16 is lowered to permit such separation being described in more detail herein.

Despite the provision of the scraping edges 14b–16b, some excess patty material 30" may nevertheless accumulate on and be carried away by the transport 18 and to salvage this material and also to clean the transport 18, other scraping facilities are provided at the entry zone 14a–16a to the chamber 10. As is particularly shown in FIG. 3 of the drawings, excess patty material 30" clinging to the edges of the transport 18 is scraped off the undersurface of said transport after it leaves the recess 22 by the edge 22a thereof. Such a scraping operation tends to cause the scraped-off material to enter the mold 20 and be carried therein towards and into the chamber 10 for subsequent intermingling with fresh patty material 30 supplied from the hopper H.

The close sandwiching relationship of the transport 18 with plates 14 and 16 leaves little room for the escape of patty material 30 through that portion of the sandwich beyond said transport 18. Nevertheless, the invention contemplates a further seal between transport 18 and at least one of the plates by which it is sandwiched; said seal being comprised of a tongue 38 and mating groove 40 respectively carried, in this example, by the upper plate 14 and transport 18 at its periphery (see FIGS. 9–12). Apart from functioning as a seal, the mating tongue 38 and groove 40 also coact to maintain the parts in their optimal relation one to another.

Exteriorly of chamber 10 both surfaces of the transport 18 are, of course, totally exposed whereby each mold 20 is thus rendered successively accessible to means 42 for the harvesting of patties 30' from time to time contained therein. As has been stated, each mold 20 is constituted by an aperture in the transport 18 whereby it is feasible to harvest patties 30' by the simple expedient of pushing them through the mold 20 clear of the undersurface thereof.

For this purpose, the invention visualizes the harvesting means 42 (see particularly FIGS. 10–12) which includes a plunger 44 equipped with a head 46 formed of a suitable substance, which head 46 may expediently be heated, and which has the cross-sectional configuration and dimensions of the mold 20 which it is thus able to engage by entering it to procure and effect expulsion of a patty 30' contained therein. Said plunger 44 forms part of a motor 48 of the piston and cylinder type as illustrated in FIGS. 10 and 12 which is operable, e.g., pneumatically, to move the plunger 44 between a retracted neutral position shown in FIG. 10 in which it is maximally elevated and an extended operative position as shown in FIG. 11 in which the head 46 is lowered and engaged within a mold 20 to eject a patty 30' therefrom.

In the present embodiment, the motor, or cylinder 48 as the motor will henceforth be described herein, has a stand-by position adjacent the exit zone 14b–16b of the chamber 10 so that the head 46 is operable to engage a mold 20 as it emerges from between the two plates 14–16; such standby position being shown in FIG. 10 of the drawings. In addition, the cylinder 48 is movable to follow the transport 18 to an advanced position at which the ejection of the patty 30' is deemed to be completed; the cylinder 48 being then operable to disengage itself by withdrawing from the mold 20 upon which it is restored to the standby position of FIG 10 by biasing means such as the spring 50.

Said withdrawal or retraction of the plunger 44 and head 46 at said advance position is normally actuated by a timing mechanism but it will be appreciated that, should such mechanism fail, the head 46 will be retained within the mold 20 of moving transport 18 and be carried towards the entry zone 14a–16a. It is thus desirable to provide emergency means for actuating retraction of the harvesting means 42 to its neutral position ready for return by spring 50 to its standby position aforesaid in the event of failure of the timing mechanism. One example of such a timing mechanism is a cam device, as illustrated diagrammatically at 71 (see FIG. 8) mounted for rotation with a drive shaft 70 for transport 18 to be more fully described herein. Such a cam device 71 would actuate a microswitch mechanism for triggering retraction or extension of the plunger 44.

As will be clearly seen from FIGS. 10 and 12 of the drawings, the cylinder 48, plunger 44 and head 46 thereof are all unitarily mounted upon a bracket 52 which is itself pivotally mounted upon a post 54 fixedly mounted within a circular bushing 56 integral with the upper surface of the top clamping plate 14; the aforesaid return spring biasing means 50 being disposed about said post 54. As will be seen from FIGS. 10 and 12 of the drawings, a shaft 58 extends vertically upwardly from the head 46 and is cranked at its upper end to mount a roller 60 thereon. Since the shaft 58 is secured to the head 46, it is, of course, axially reciprocable therewith according to the axial disposition of the head 46 relative to the transport 18.

The post 54 carries a cam 62 thereon so located as to be engageable by the roller 60 if the entire harvesting means 42 is carried to an excessive degree past the normal advance position towards the entry zone 14a–16a of chamber 10. It should be appreciated that normally the timing device 71 will operate to remove the head 46 from the mold 20 after expulsion of a patty 30' therefrom but, if for some reason such timing device does not function properly, further movement of the cylinder 48 and its associated parts caused by continued rotation of the transport 18 will cause actuation of the aforesaid emergency means comprised of the roller 60 and cam 62 thereby physically lifting the whole plunger and head assembly out of the mold 20 as shown in FIG. 12 of the drawings. For the sake of convenience, the position as shown in FIG. 12 will hereinafter be referred to as the overtravel position.

In the standby position of plunger 44, its head 46 may be brought into actual brushing engagement with moving transport 18; there being a head of air in the cylinder 48 urging said head 46 against transport 18 to insure virtually instantaneous entry of said head 46 into mold 20 as soon as transport 18 carries the mold 20 into alignment with head 46.

In the preferred form of the invention, however, there is no actual contact between transport 18 and head 46 in said standby position; the indexing pin 64 illustrated in FIGS. 10–12 serving, instead, as a finder for mold 20. Said indexing pin 64 is coupled by bracket 66 for conjoint movement with plunger 44 and projects slightly forward of plunger head 46. Thus when said plunger 44 is extended towards its mold-intercepting position but whilst still in its standby position as shown in FIG. 10, said indexing pin 64 will also be extended and, since it projects forwardly of plunger head 46, it will make initial contact with transport 18 thereby initially spacing said plunger head 46 from said transport 18.

Said transport 18 also carries at least one perforation 68 so located as to be carried under indexing pin 64 which will thereupon enter therein permitting further movement of plunger 44 towards transport 18 (see FIG. 11).

As will be appreciated, the parts are so arranged that registration of mold 20 with plunger head 46 will occur simultaneously with the registration of indexing pin 64 and perforation 68 so that each of these combinations will mate at the same time thereby obviating undesirably premature friction between plunger head 46 and transport 18.

As mentioned before, said cylinder 48 is swingably supported on and projects in cantilever fashion from the shaft 54 secured within the bushing 56 which is integral with the upper plate 14. Positionally, it is concentric with a further shaft 70 (see FIGS. 8, 9 and 13) which drives the present rotary transport 18 by means of a key 72 having offset and sharpened lobes 74—74 which fit into matching keyways 76 undercut to accommodate the key lobes 74—74 thus obviating disengagement of the key 72 from said keyway 76 while the transport 18 is being driven without, however, impeding the axial separation of these parts when they are at rest.

As shown in FIG. 13, in the present instance, a reduced stub 78 of transport drive shaft 70 projects through transport 18 for engagement within a lower open end of the bushing 56. It will be understood that, although both are engaged within the same bushing 56, there is no other connection between shafts 70 and 54.

In the presently preferred form of the apparatus as illustrated in the drawings, the drive shaft 70 is disposed in axially erect condition underneath the circular transport 18 which is sandwiched between plates 14–16 so that its central areas and particularly its keyway 76 are exposed to engagement by key 72.

The upper plate 14 is fixedly mounted on a frame F of the present machine by means of posts 80; the lower plate 16 being dependently supported and secured thereto by the fasteners 26—26 which are adjustable to permit a wider or narrower separation between the two plates 14–16 in order to accommodate a thicker or thinner transport 18 or to apply varying degrees of compressive force thereto.

In addition, the lower plate 16 is also supported on the upper end of a rotatable jackscrew 82 (see FIG. 8) having a lower threaded end 84 engaged in a fixed and threaded sleeve 86.

When free to do so, the lower plate 16 may thus be raised or lowered by rotation of jackscrew 82 in said threaded sleeve 86, said rotation being expediently effected by hand wheel 88 secured to jackscrew 82 and corotatable therewith.

The jackscrew 82 is sleeved at 92 through one end of a cantilever bracket 90, the other end of which provides a further sleeve 94 constituting a lower journal as well as a thrust collar for the drive shaft 70. A collar 96 is fixedly secured to jackscrew 82 above sleeve 92 and a coil compression spring 98 is mounted about the threaded portion 84 of the jackscrew to bear at its lower end against sleeve 86 and at its upper end against sleeve 92.

Upon tightening of the jackscrew 82 to sandwich transport 18 between plates 14–16, the drive shaft 70 is thus spring-urged upwardly by means of springs 98. Conversely, loosening of the jackscrew 82 will lower collar 96 compressing the spring 98 and thus permitting lowering of the drive shaft 70.

When freed to do so by adjustable fasteners 26—26 and when sufficiently lowered, the said transport 18 and even lower plate 16 may be removed for cleaning or other purposes; they being substantially reassemblable by simple reengagement with shaft 70 and jackscrew 82, respectively; the adjustable fasteners 26—26 being then operated to complete the assembly and apply the desired compression to the resandwiched transport 18.

One complete cycle of operations of the machine will now be described wherein, for the sake of clarity, only one of the molds 20 in the transport 18 will be considered.

Figure 1:
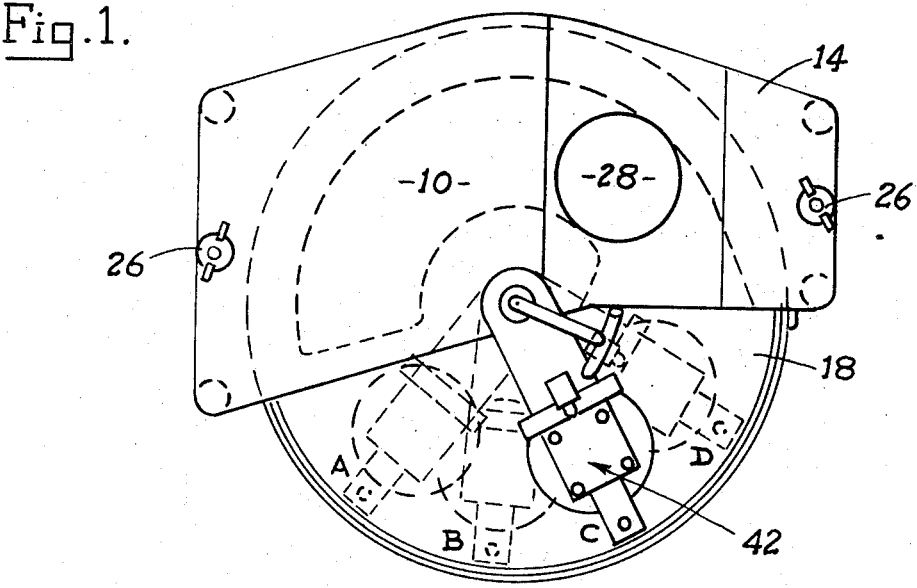
FIG. 1 is a top plan view of the instant machine in somewhat diagrammatic form illustrating various positions of the harvesting means.

Referring first of all to FIG. 1 of the drawings, there is shown therein four positions of the harvesting means 42 wherein the standby position is indicated at A, the ejection position is indicated at B, the advance position is indicated at C, whilst the overtravel position is indicated at D. A complete cycle of operations as described herein is considered with an empty mold 20 initially located at the position indicated at C in FIG. 1, the direction of rotation of the transport 18 being counterclockwise with respect to the plan view of FIG. 1.

It will be appreciated that position C in FIG. 1, being the advance position aforesaid of the harvesting means, indicates that a patty has just been ejected from the mold 20 and the harvesting means will thereafter return immediately to its standby position A under actuation of the cylinder 44 and return spring 50. Thus, rotation of the transport 18 will bring the empty mold 20 into the entry zone 14a–16a between the plates 14–16 at which time it may be considered as being at the position 20' as indicated in FIG. 2 and as shown sectionally in FIG. 3.

As has been hereinbefore described, entry of the mold 20 between plates 14–16 will procure scraping of excess patty material 30'' by the edge 22a of recess 22, such scraped material thence being carried onwardly by the mold 20 as it progresses further between the plates 14–16.

Figure 2:
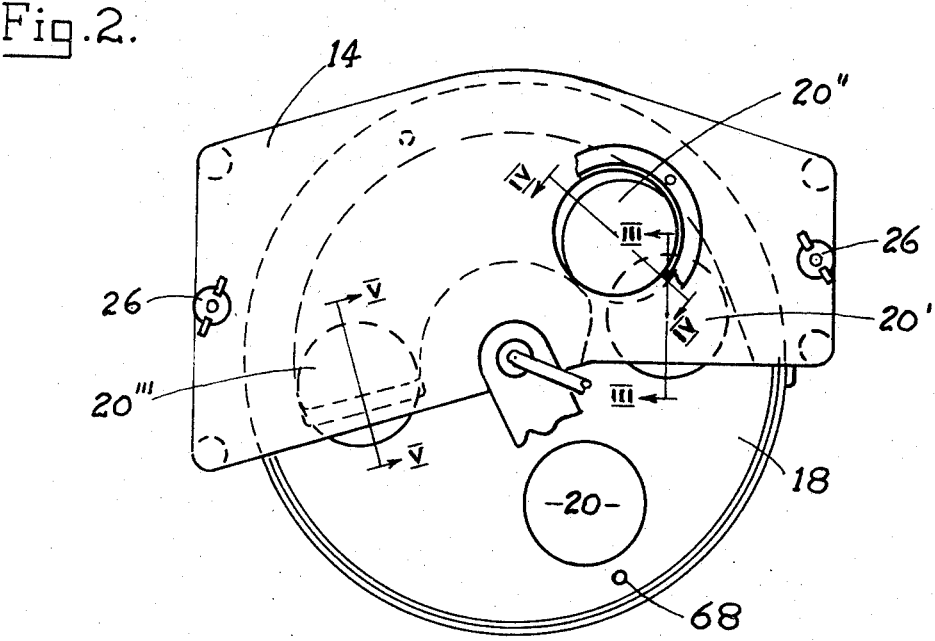
FIG. 2 is a similar view to that shown in FIG. 1 with the harvesting means being broken away and various positions of a mold being shown during the cyclic rotation of the transport.

The next position of the mold to be considered is that shown at 20'' in FIG. 2 and as indicated in section in FIG. 4. At this time, the mold 20 has come almost into full registration with the delivery spout 27 from which patty material 30 is being delivered under pressure from hopper H. Referring specifically to FIG. 4 of the drawings, it will be seen that such patty material 30 fills and passes through the mold 20 and into trough 24 in lower plate 16 so that mold 20 is completely surrounded by patty material under pressure during its further movement along the arcuate path through the chamber 10. The patty material 30 is caused to flow within the chamber 10, under the action of auger 32, from the spout 27 towards the exit zone 14b–16b; such flow, as has been mentioned herein, also being assisted by the rotative action of transport 18 as it passes through the said chamber 10. As has been mentioned hereinbefore, the communication which is effectively established between the interior of the chamber 10 and the exterior thereof via the mold 20 enables the patty material 30 to flow into and completely fill mold 20 as it emerges from the chamber 10; the scraping edges at 14b and 16b serving to prevent, as well as possible, extraneous patty material from being carried out between the plates 14–16 upon the upper and lower surfaces of transport 18.

The next position under consideration is as indicated at 20''' in FIG. 2 and as illustrated in section in FIG. 5. At this time, the mold 20 has started to emerge from between plates 14–16 and, referring particularly to FIG. 5, it can be seen that the edges 14b and 16b have substantially leveled off patty 30' now contained within the mold 20.

As the mold 20 with patty 30' contained therein emerges from between the plates 14–16, or at some convenient time slightly before or after such emergence, the timing mechanism 71 operates to extend the plunger 44 into its mold-intercepting position, whilst still at standby position A, at which time the index pin 64 will contact the upper surface of the transport 18 thereby spacing the plunger head 46 slightly above the upper surface of the transport, this position being indicated in FIG. 10 of the drawings. Continued counterclockwise rotation of the transport 18 will eventually align the index pin 64 and corresponding perforation 68 at which time the plunger head 46 will enter into and eject patty 30' from the mold 20 substantially at ejection position B.

Since the transport 18 is continuously rotating, the plunger head 46 will be carried around by the transport while it is so engaged for ejection within the mold 20 substantially between the positions A through C as shown in FIG. 1.

At position C, the mold is, of course, empty since the patty 30' has been ejected and the timing mechanism 71 normally operates to retract plunger 44 to lift the head 46 harvesting mechanism 42 to be returned to its standby clear of the empty mold 20 thereby permitting the entire position A under influence of the spring means 50. Thus, a complete cycle of operations will have been completed under normal conditions.

However, if for some reason, the timing mechanism does not function correctly, the plunger head 46 may be carried within the mold 20 to the overtravel position D as shown in FIG. 1 at which time the emergency means will be actuated as hereinbefore described to physically remove the plunger head 46 from the empty mold 20.

Thus, to recapitulate broadly, each time a mold 20 approaches the exit zone of chamber 10, the cylinder 48 is activated by timing means 71 to extend its plunger 44 to the mold-intercepting position of FIG. 10 in which position the plunger head 46 is poised and biased to snap into and enter the mold 20 and procure ejection of the patty 30' therefrom as soon as said mold 20 emerges from said exit zone 14b–16b and is in registration with the plunger head 46; said ejection position being shown in FIG. 11 of the drawings and indicated generally by position B in FIG. 1. The plunger head 46 is disengaged and withdrawn from the mold 20 at said advance position, illustrated as position C in FIG. 1, following the complete ejection of the patty 30' from the mold 20.

It is noteworthy, however, that movement of the transport 18 is not interrupted during this operation. Resultantly, whilst and so long as the plunger head 46 is engaged with the mold 20, the transport 18 will have advanced some distance towards the chamber entry zone 14a–16a being followed in said advance by the cylinder 48 until disengaged as aforesaid either at its normally predetermined timed advance position C or, as hereinbefore described, in its overtravel position D as illustrated in FIG. 12.

It will be appreciated that the hereinbefore described embodiments of the invention have been selected solely for the expository purposes hereof and should not be construed in a limiting sense; various modifications being readily suggestible to those skilled in the art and the true scope of the invention being restricted only by the claims hereinafter set forth.

What I claim is:

1. Machinery for forming patties including:
a pair of plates having mutually confronting faces, at least one of said plates having a trough in its said confronting face constituting a chamber for receiving patty material therein;
apparatus for filling said chamber with patty material at a rate maintaining therein a constant pressurized supply of said material;
at least one mold chargeable with patty material to form patty;
a plane transport sandwiched between said plates in slidable engagement with the respective said faces thereof for cyclically transporting said mold between the interior and exterior of said chamber, the mold being open to be charged with patty material on each entry into the chamber;
entry and exit openings in said chamber for said transport;
scraping means at one at least of said openings for recovering excess patty material clinging to said transport; and
means disposed exteriorly of said chamber for harvesting patties from said mold.

2. Machinery as claimed in claim 1 wherein:
said scraping means is constituted by the edges of said plates at the exit opening of the chamber for recovering excess material as aforesaid and also for levelling the patty material contained in the mold transported through said opening by the transport.

3. Machinery as claimed in claim 1 wherein:
both of said plates have mutually confronting troughs in their said confronting faces together constituting the said chamber.

4. Machinery as claimed in claim 1 wherein:
said transport is a rotary member and the mold is constituted by an aperture in said transport.

5. Machinery as claimed in claim 2 wherein:
said mold and said plate edges are dimensioned and oriented relative to one another to afford communication from the interior of said chamber to the exterior thereof via a said mold.

6. Machinery for forming patties including:
a chamber for patty material;
apparatus for filling said chamber with patty material at a rate maintaining therein a constant pressurized supply of the material;
at least one mold chargeable with patty material to form patties;
a transport for cyclically transporting said mold between the interior and exterior of said chamber, the mold being open to be charged with patty material on each entry into the chamber; and
harvesting means disposed exteriorly of said chamber movable between a standby position and an advance position;
means for procuring engagement of said harvesting means with the said mold at said standby position for harvesting patties therefrom and for procuring disengagement thereof at said advance position at which the said harvesting is completed;
the harvesting means being free floating permitting it to be moved by and with said transport from said standby position to said advance position while engaged with said mold and being biased to return to said standby position when disengaged from said mold.

7. Patty forming machinery as set forth in claim 6 wherein:
said harvesting means includes a plunger movable between a neutral position and a mold-intercepting position;
said plunger being cocked for engagement with the said mold at said mold-intercepting position.

8. Patty forming machinery as set forth in claim 6 including:
emergency means for procuring disengagement of said harvesting means from said mold in the event of failure of the first-named means to procure such disengagement;
the emergency means aforesaid being located to perform its function before the mold reenters the chamber.

9. Patty forming machine as set forth in claim 7 wherein:
the means procuring engagement and disengagement of the harvesting means with and from said mold is constituted by a motor of the piston and cylinder type;
the plunger being connected and cooperable with the piston of said motor.

10. Patty forming machinery as set forth in claim 7 including:
an indexing element associated and comovable with said plunger and a formation in said transport engageable by said element when the plunger is in its mold-intercepting position;
the engagement of said indexing element with the formation on the transport procuring actual engagement of said plunger with said mold.

11. Patty forming machinery as claimed in claim 7 wherein:
said transport is a rotary member and the mold is constituted by an aperture in said transport.

12. Machinery for forming patties including:
a pair of plates having mutually confronting faces, at least one of said plates having a trough therein in its said confronting face constituting a chamber for receiving patty material therein;

apparatus for filling said chamber with patty material at a rate maintaining therein a constant pressurized supply of said material;

at least one mold chargeable with patty material to form patties;

a plane transport sandwiched between said plates in slidable engagement with the respective said faces thereof for cyclically transporting said mold between the interior and exterior of said chamber, the mold being open to be charged with patty material on each entry into the chamber;

entry and exit openings in said chamber for said transport;

scraping means at one at least of said openings for recovering excess patty material clinging to said transport; and harvesting means disposed exteriorly of said chamber movable between a standby position and an advance position;

means for procuring engagement of said harvesting means with the said mold at said standby position for harvesting patties therefrom and for procuring disengagement thereof at said advance position at which the said harvesting is completed;

the harvesting means being free floating permitting it to be moved and with said transport from said standby position to said advance position while engaged with said mold and being biased to return to said standby position when disengaged from said mold.

References Cited

UNITED STATES PATENTS

| | | | |
|---|---|---|---|
| 2,185,174 | 1/1940 | Hendler | 17—32 |
| 2,651,430 | 9/1953 | Garfunkel | 17—32 |
| 2,708,287 | 5/1955 | Long et al. | 17—32 |
| 2,793,394 | 5/1957 | Menkens | 17—32 |
| 3,421,220 | 1/1969 | Stanga | 31—46 |

ALDRICH F. MEDBERY, Primary Examiner

U.S. Cl. X.R.

18—12; 31—46; 107—19